Aug. 29, 1939.　　　G. STINSON　　　2,171,013
FOLDING BABY CARRIAGE
Filed July 21, 1938　　　2 Sheets-Sheet 2
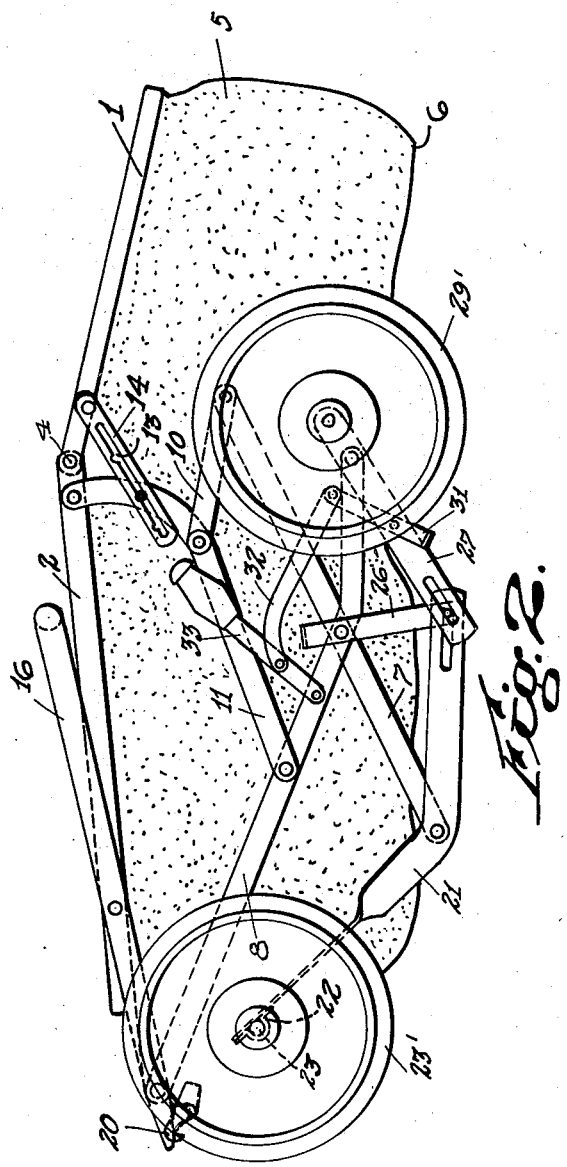
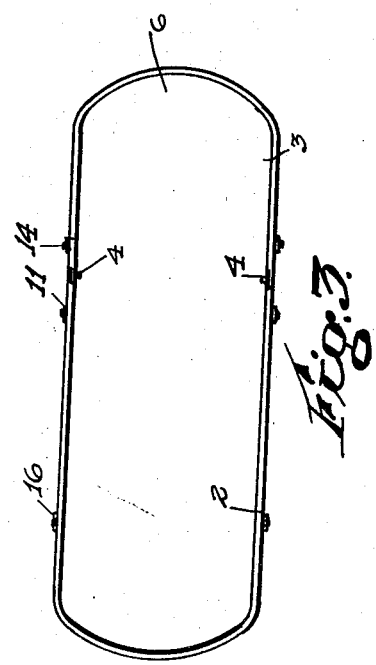
Inventor:
George Stinson
By Geo. H. Kennedy Jr.
Attorney Patented Aug. 29, 1939

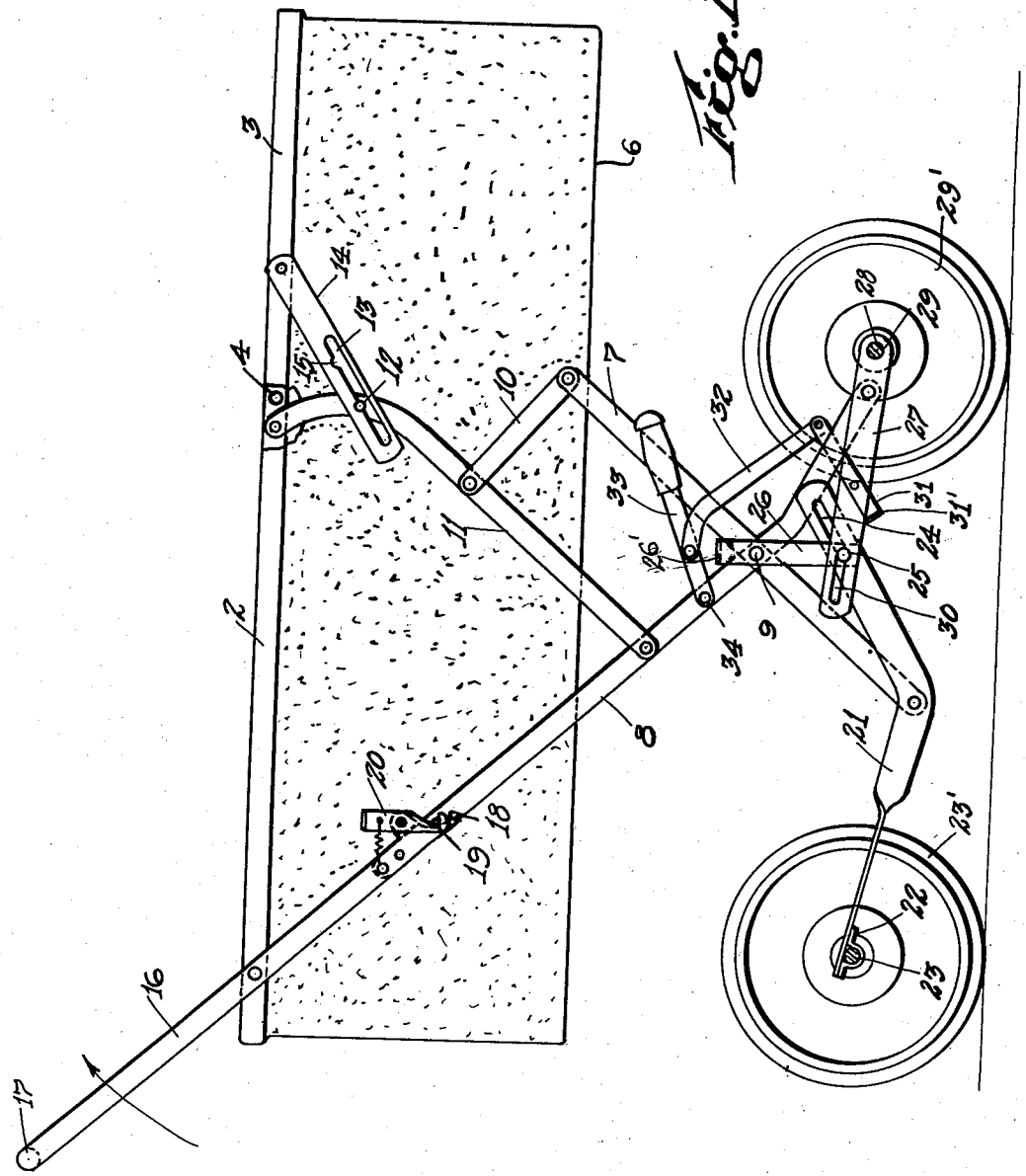

2,171,013

UNITED STATES PATENT OFFICE 2,171,013

FOLDING BABY CARRIAGE

George Stinson, Gardner, Mass., assignor to Heywood-Wakefield Company, Gardner, Mass., a corporation of Massachusetts Application July 21, 1938, Serial No. 220,583

5 Claims. (Cl. 280—41)

The present invention relates to folding baby carriages and particularly to the type which may be collapsed into a small area for transportation and may be readily erected to form either a full length carriage or a carriage with a seat so that the child may be seated therein.

In prior devices of this character the supporting frame for the seat or cradle has been made up of a pair of side arms on each side of the seat which are pivotally connected between their extremities and which carry at their lower ends the wheels which support the carriage. When this type of carriage is collapsed the wheels necessarily extend beyond the lower ends of the side members and do not permit collapsing of the device into the smallest possible space. One of the principal objects of the present invention is to provide for mounting the wheels so that more complete collapsing of the carriage is possible.

A further feature of the invention resides in a provision for opening the carriage from its collapsed condition by a single movement of the handle by which the carriage is propelled, this single movement placing the wheels in operative position and at the same time locking the side members against relative movement so that the carriage may remain in a usable condition.

Other and further objects and advantages of the invention will appear from the following detailed description taken in connection with the accompanying drawings in which—

Fig. 1 is a side elevation of a carriage embodying the invention, when extended for use.

Fig. 2 is a side elevation of the carriage of Fig. 1, when collapsed.

Fig. 3 is a plan view of the carriage of Fig. 1.

Like reference characters refer to like parts in the different figures.

With reference to the drawings, the carriage body 1 consists of a pair of U-shaped elements 2 and 3 having their free ends connected together by pivot pins 4 to form a substantially rectangular supporting frame for the fabric cradle 5 which is suspended therefrom. The fabric cradle 5 has a reinforced flat bottom 6 which is arranged for folding at spaced points. As this is not a feature of the invention it need not be described in detail.

The supporting frame for the body consists of a pair of side arms 7 and 8 on each side of the cradle, only one of the pairs of side arms being shown, as the supporting structures on opposite sides of the carriage are identical. The arms 7 and 8 are pivotally connected together intermediate their ends by a pivot pin 9. The upper end of the arm 7 is connected by a link 10 to an arm 11, which at its upper end is secured to the U-shaped element 2 adjacent the forward end thereof. The lower end of the arm 11 is pivoted to the arm 8 in spaced relation to the pivotal connection of the arms 7 and 8. On each of the arms 11 is a headed pin 12 engageable in a slot 13 in a plate 14 pivotally secured to the element 3. The plate 14 has notches 15 communicating with the slot 13 and the plate, and accordingly, the element 3 may be held in any of several predetermined positions relative to the element 2 by engagement between the pin 12 and the notches.

At the upper end of the arm 8 is pivotally connected the lower end of one of the legs 16 of the U-shaped handle 17. Each of the legs of the U-shaped handle is pivoted to the element 2 adjacent the rearward end thereof, this pivotal connection being spaced from the pivotal connection between the leg 16 and the arm 8. The lower end of the leg 16 overlies the arm 8 and has a notch 18 therein engageable with a pin 19 which limits the relative pivotal movement between the arm and leg. A spring controlled locking member 20 is pivoted to the lower end of the leg 16 in a position to engage with the pin 19 and lock the arm 8 and leg 16 against movement from the position of Fig. 1.

On the lower end of the arm 7 is pivoted a lever 21, the rearward end of which has a U-shaped plate 22 for clamping the rear axle 23 of the carriage. The latter has wheels 23' at opposite ends thereof, as will be apparent. The forward end of the lever 21 has a slot 24 engageable with a pin 25 carried by the depending arm 26 which is mounted on the same pin 9 that provides the pivotal connection between the arms 7 and 8.

At the lower end of the arm 8 is mounted a lever 27, the forward end of which has an opening 28 to receive the front axle 29 of the carriage. This axle has wheels 29' on opposite ends thereof, as will be apparent. The rearward end of the lever 27 has a slot 30 engageable with the pin 25.

On the lever 27, between the slot 30 and its pivotal connection to the arm 8, is pinned a short member 31 having a laterally extending lower end 31' engageable with the tread on one of the wheels 29'. The upper end of the member 31 is connected by a link 32 to a brake lever 33 turnable on a pin 34 in the arm 8. The length of the link 32 is such that the brake lever may be turned counterclockwise into the dot-dash line position of Fig. 1 for locking the brake in operative position.

It will be understood that the supporting structure for the carriage is duplicated on the opposite side. The upper ends of the arms 26 may be connected together by a laterally extending bar 26', if desired. To collapse the carriage from the position of Fig. 1, the locking member 20 is disengaged from the pin 19 by moving the upper end of the member forwardly and the handle 17 is then moved forwardly in the direction of the arrow. This movement allows the upper ends of the arms 7 and 8 to move apart, thereby causing the elements 2 and 3 to move toward the carriage axles. At the same time the lever 21 is swung clockwise by reason of the upward movement of the central pivoting of the lever relative to the pin 25 and similarly the lever 27 is swung counterclockwise, thereby raising the front and rear wheels 28 and 29 above the pins 9 which connect the arms 7 and 8 together.

For opening the carriage for use, it is necessary merely to lift upwardly and rearwardly on the handle 17, which, through the action of the arms 7 and 8, will extend the carriage to the position of Fig. 1, where it is automatically locked by the locking member 20.

I claim:

1. A supporting frame for carriage bodies comprising front and rear axles, a pair of pivotally connected side arms on each side of the carriage body, means connecting one arm of each pair to the carriage body, a handle pivoted to the carriage body and pivotally connected at its lower end to the other arm of each pair, releasable locking means for holding said other arm and the handle in predetermined relation to each other, a lever pivoted on the lower end of one arm of each pair of arms, said levers supporting one of the axles in spaced relation to the pivotal connection of the levers to the arms, and means for supporting said levers at a point spaced from the axle, said means being spaced from the pivotal connection of each pair of side arms.

2. A supporting frame for carriage bodies comprising front and rear axles, a pair of pivotally connected side arms on each side of the carriage body, means connecting one arm of each pair to the carriage body, a handle pivoted to the carriage body and pivotally connected at its lower end to the other arm of each pair, releasable locking means for holding said other arm and the handle in predetermined relation to each other, a lever pivoted on the lower end of one arm of each pair of arms, said levers supporting one of the axles in spaced relation to the pivotal connection of the levers to the arms, each of said levers having a slot therein and a pin in spaced relation to the pivotal connection of each pair of side arms for engagement in the slot.

3. A supporting frame for carriage bodies comprising front and rear axles, a pair of pivotally connected side arms on each side of the carriage body, means connecting one arm of each pair to the carriage body, a handle pivoted to the carriage body and pivotally connected at its lower end to the other arm of each pair, releasable locking means for holding said other arm and the handle in predetermined relation to each other, a lever pivoted on the lower end of each side arm, corresponding levers supporting one of the axles in spaced relation to the pivotal connection of the corresponding levers to the arms, and means for supporting all of said levers at points spaced from the connection between the axles and the levers, said means preventing movement of the levers relative to the arms when the carriage is extended.

4. A supporting frame for carriage bodies comprising front and rear axles, a pair of pivotally connected side arms on each side of the carriage body, means connecting one arm of each pair to the carriage body, a handle pivoted to the carriage body and pivotally connected at its lower end to the other arm of each pair, releasable locking means for holding said other arm and the handle in predetermined relation to each other, a lever pivoted on the lower end of one arm of each pair of arms, said levers supporting one of the axles in spaced relation to the pivotal connection of the levers to the arms, a slot in each of said levers, and a pin mounted in spaced relation to the pivotal connection of the arms and engaging in said slot.

5. A supporting frame for carriage bodies comprising front and rear axles, a pair of pivotally connected side arms on each side of the carriage body, means connecting one arm of each pair to the carriage body, a handle pivoted to the carriage body and pivotally connected at its lower end to the other arm of each pair, releasable locking means for holding said other arm and the handle in predetermined relation to each other, a lever pivoted on the lower end of one arm of each pair of arms, said levers supporting one of the axles in spaced relation to the pivotal connection of the levers to the arms, each of said levers having a slot therein, a link extending from the pivotal connection of each pair of arms, and a pin on each link engaging with said slots.

GEORGE STINSON.